(12) United States Patent
Swanson et al.

(10) Patent No.: US 7,184,149 B2
(45) Date of Patent: Feb. 27, 2007

(54) METHODS AND APPARATUS FOR REDUCING ERROR IN INTERFEROMETRIC IMAGING MEASUREMENTS

(75) Inventors: Gary J. Swanson, Lexington, MA (US); Lyle Shirley, Boxborough, MA (US); William John Hubbard, Litchfield, NH (US); Robert Cleveland Abbe, Newton, MA (US)

(73) Assignee: Dimensional Photonics International, Inc., Wilmington, MA (US)

( * ) Notice: Subject to any disclaimer, the term of this patent is extended or adjusted under 35 U.S.C. 154(b) by 65 days.

(21) Appl. No.: 10/871,878

(22) Filed: Jun. 18, 2004

(65) Prior Publication Data

US 2005/0024648 A1 Feb. 3, 2005

Related U.S. Application Data

(60) Provisional application No. 60/479,534, filed on Jun. 18, 2003.

(51) Int. Cl.
*G01B 9/02* (2006.01)
*G01D 5/36* (2006.01)

(52) U.S. Cl. ................................. 356/521; 250/237 G
(58) Field of Classification Search ................ 356/488, 356/494, 499, 521; 250/237 G
See application file for complete search history.

(56) References Cited

U.S. PATENT DOCUMENTS

| | | | |
|---|---|---|---|
| 5,610,719 A * | 3/1997 | Allen et al. | ................... 356/614 |
| 5,811,826 A | 9/1998 | Shirley | |
| 5,870,191 A | 2/1999 | Shirley et al. | |
| 5,900,936 A | 5/1999 | Shirley et al. | |
| 6,031,612 A | 2/2000 | Shirley | |
| 6,084,712 A * | 7/2000 | Harding | ....................... 359/618 |
| 6,229,619 B1 | 5/2001 | Shirley | |
| 6,259,561 B1 | 7/2001 | George et al. | |
| 6,341,015 B2 | 1/2002 | Shirley | |
| 6,583,932 B1 | 6/2003 | George et al. | |
| 6,690,474 B1 | 2/2004 | Shirley | |
| 6,937,350 B2 * | 8/2005 | Shirley | ....................... 356/630 |

(Continued)

FOREIGN PATENT DOCUMENTS

DE 198 45 145 4/2000

(Continued)

OTHER PUBLICATIONS

PCT International Search Report for PCT Application No. PCT/US2004/019547.

*Primary Examiner*—Gregory J. Toatley, Jr.
*Assistant Examiner*—Patrick Connolly
(74) *Attorney, Agent, or Firm*—Guerin & Rodriguez, LLP

(57) ABSTRACT

The present invention provides a method and apparatus for reducing error in interferometric fringe stability and reproducibility in an interference fringe generator. In one aspect, the method for reducing error in interferometric fringe stability and reproducibility includes providing a light source, positioning a grating to receive light from the light source and positioning a projection lens having a focal length F to receive light from the grating. The projection lens projects the received light upon an object of interest positioned substantially at a distance $d_1$ from the lens. Typically the lens is positioned substantially at a distance $d_2$ from the grating. The values of $d_1$, $d_2$, and F are related by $d_2$ being approximately equal to $d_1 F/(d_1-F)$.

4 Claims, 4 Drawing Sheets

$$I(x) = \cos^2\left[\frac{2\pi}{T}\left\{\left(\frac{F}{d_1-F}\right)x - \left(d_2 - \frac{d_1 F}{d_1-F}\right)\theta\right\}\right]$$

U.S. PATENT DOCUMENTS

| | | |
|---|---|---|
| 2001/0009462 A1 | 7/2001 | Shirley |
| 2001/0048493 A1* | 12/2001 | Swanson et al. .............. 349/62 |
| 2002/0158193 A1* | 10/2002 | Sezginer et al. ........ 250/237 G |
| 2003/0011789 A1 | 1/2003 | Shirley |
| 2003/0038933 A1 | 2/2003 | Shirley et al. |
| 2003/0039388 A1 | 2/2003 | Ulrich |
| 2003/0072011 A1 | 4/2003 | Shirley |
| 2004/0105100 A1 | 6/2004 | Shirley |
| 2004/0178327 A1* | 9/2004 | Widdowson et al. ....... 250/221 |

FOREIGN PATENT DOCUMENTS

| | | |
|---|---|---|
| DE | 199 44 354 | 4/2001 |

* cited by examiner

METHODS AND APPARATUS FOR REDUCING ERROR IN INTERFEROMETRIC IMAGING MEASUREMENTS

CROSS REFERENCE TO RELATED APPLICATIONS

This application claims the benefits of and priority to provisional U.S. Provisional Patent Application Ser. No. 60/479,534 filed on Jun. 18, 2003 the disclosure of which is hereby incorporated herein by reference in its entirety.

FIELD OF THE INVENTION

The present invention relates generally to the field of imaging technology and, more specifically, to three-dimensional imaging methods and devices.

BACKGROUND OF THE INVENTION

Measuring the characteristics of an object and generating a three dimensional representation of the object from acquired sensor data are central objectives in the field of metrology. The continuing development of various techniques to achieve these objectives is often grounded in using interferometric principles to obtain precise measurement data. In parallel with the development of fundamental imaging and metrology technologies for science and industry, refining and improving upon existing approaches represents a valuable and necessary contribution to modern day research efforts. Thus, given the wide use of interferometric approaches, it follows that a need exists for methods and devices that reduce errors in present and future interferometric based imaging and metrology applications.

SUMMARY OF THE INVENTION

The present invention provides a method and apparatus for reducing error in interferometric fringe stability and reproducibility in an interference fringe generator. In one aspect, the method for reducing error in interferometric fringe stability and reproducibility includes providing a light source, positioning a grating to receive light from the light source and positioning a projection lens having a focal length F to receive light from the grating. The projection lens projects the received light upon an object of interest positioned substantially at a distance $d_1$ from the lens. Typically the lens is positioned substantially at a distance $d_2$ from the grating. The values of $d_1$, $d_2$, and F are related by $d_2$ being approximately equal to $d_1 F/(d_1-F)$.

Generally, the terms fringe projector and fringe generator are used interchangeably throughout the application. Such devices alone or in combination with other components cause the formation of interference fringes in space. Such fringes are typically generated or projected upon the surface of an object of interest. These devices differ from standard image projectors that do not utilize interference principles.

In another aspect, the invention relates to an optical system for reducing error in interferometric fringe stability and reproducibility in an interference fringe generator. The system typically includes a light source, a grating positioned to receive light from the light source and a lens for projecting fringes having a focal length F. The lens is positioned to receive light from the grating and to project the received light upon an object of interest positioned substantially at a distance $d_1$ from the lens. Typically, the lens is positioned substantially at a distance $d_2$ from the grating. The values of $d_1$, $d_2$, and F are related by $d_2$ being approximately equal to $d_1 F/(d_1-F)$. In various embodiments the light source is a coherent light source such as a laser. In other embodiments an acousto-optical modulator or other diffractive element is used in lieu of a grating.

In another aspect, the invention relates to a method for reducing errors in positional information obtained from a translatable grating in an interference fringe generator. The method includes positioning a translatable grating substantially defining a first plane within a fringe projector. Positioning an encoder scale defining a second plane substantially orthogonal to the first plane directly over the grating is another step in the method. The method also includes measuring the relative motion of the grating with respect to the encoder scale. In various embodiments the grating and encoder scale are manufactured on the same substrate. In various embodiments the grating and encoder scale are made from the same material. In one embodiment of the invention the encoder read-head is aligned with the optical axis of the system's projection lens.

In yet another aspect, the invention relates to a method for reducing errors in positional information obtained from a translatable grating in an interference fringe generator. The method includes positioning a translatable grating substantially defining a first plane within a fringe projector. The method also includes positioning two encoder scales substantially parallel to the first plane at positions above and below the grating. Measuring the relative motion of the grating with respect to the encoder scales and using differential information from the relative motion of the grating with respect to the encoder scales to reduce pitch based errors are also steps in the disclosed method.

Other aspects and advantages of the present invention will become apparent from the following drawings, detailed description, and claims, all of which illustrate the principles of the invention, by way of example only.

BRIEF DESCRIPTION OF THE DRAWINGS

The foregoing and other objects, features, and advantages of the invention described above will be more fully understood from the following description of various embodiments, when read together with the accompanying drawings. In the drawings, like reference characters generally refer to the same parts throughout the different views. The drawings are not necessarily to scale, and emphasis instead is generally placed upon illustrating the principles of the invention.

DESCRIPTION OF THE PREFERRED EMBODIMENTS

In various metrology applications and imaging systems, interference principles form the underlying basis upon which the application or system operates. In one exemplary imaging apparatus two point sources of light are employed to produce interference fringes. Typically coherent light is used, such as for example a laser. These two point sources may derive from an original source that was previously split or otherwise modified by an arrangement of one or more optical elements, such as a diffractive element. In systems of this type, light from the two point sources is directed and manipulated such that it expands and overlaps. As a result of this interaction, controlled sinusoidal fringes, also known as accordion fringes, are produced throughout space.

As the generation of these fringes is controlled, various parameters regarding the fringes as well as the apparatus and methods which produced them are known. Thus, when the fringes impinge on an object, surface profile and dimensional information about that object may be calculated after the fact. In one embodiment this is achieved by imaging the fringes, typically with a detector such as a conventional camera or CCD array, optionally changing the fringes according to a prescribed process, and finally calculating point cloud information about the object. From this it is clear that the positional stability and repeatability of the fringes is important when making high quality measurements.

One factor in the design of interferometric imaging and metrology devices or processes that often results in positional stability fringe error is movement in the fringe producing light source. In part, the invention is directed to both apparatus and methods for mitigating the effects of light source angular movement that contribute to undesirable fringe pattern motion.

Figure 1:
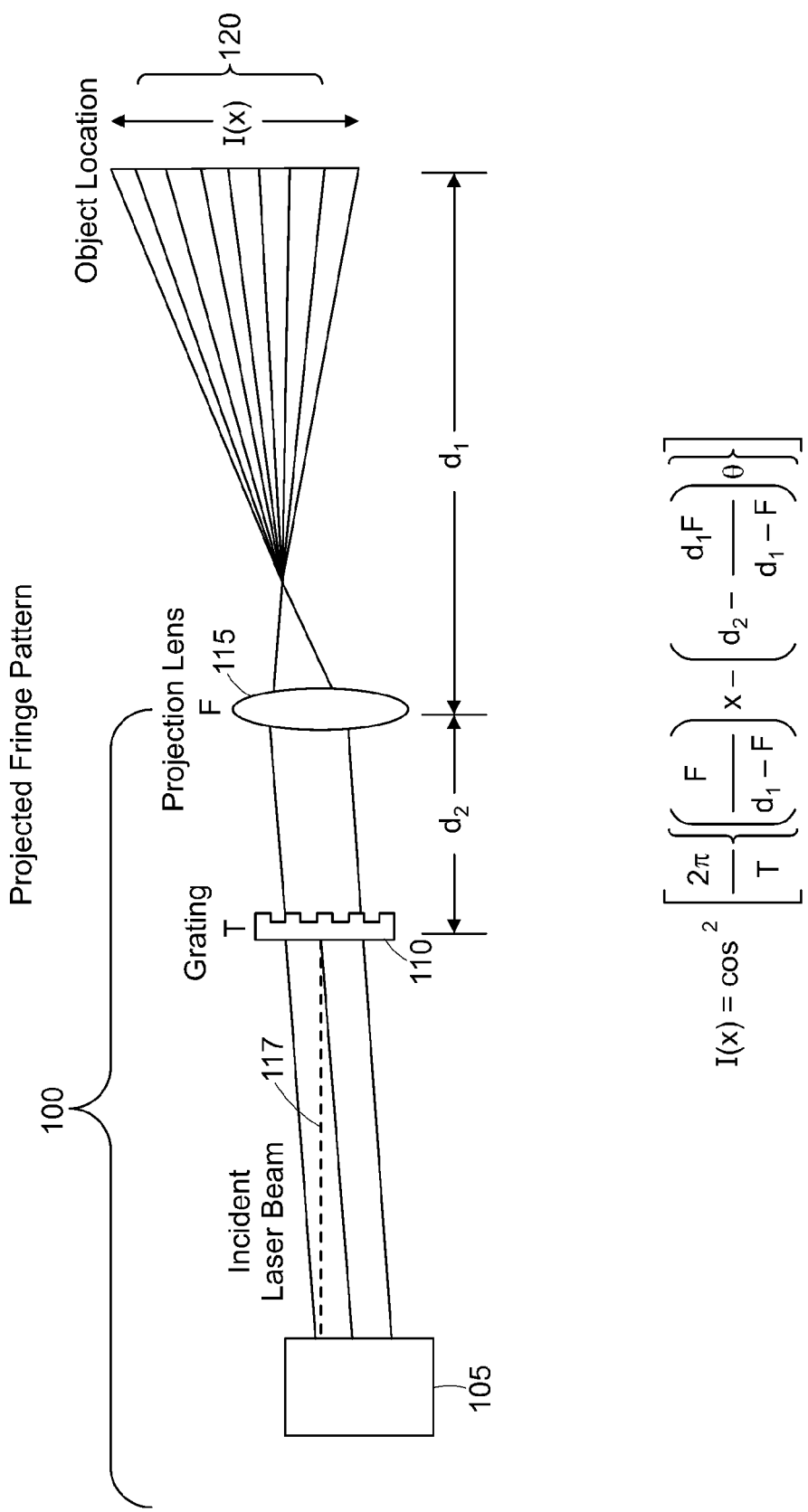
FIG. 1 is a schematic representation of an embodiment of a portion of an interference fringe generating system in accordance with the teachings of the invention.

FIG. 1 shows a schematic representation of the fringe generating portion 100 of an imagining device. At a general level, in the embodiment shown, the fringe generating portion 100 includes a light source 105, a diffractive element, shown as grating 110, and a projection lens 115. The projection lens 115 has a focal length F and the grating has a period T. Although a grating 110 is shown in this embodiment, other diffractive elements can be used instead, such as an acousto-optical modulator. The optical axis 117 of the projection lens 115 is designated by the dotted line shown. The incident angle of the system's light source 105, shown here as a laser, with respect to the optical axis 117 of the projection lens is θ. As shown in the figure, the longitudinal separation between the grating 110 and projection lens 115 is $d_2$ and the distance between the projection lens and the region of measurement 120 for the object of interest is $d_1$.

A straightforward diffraction analysis reveals that the sinusoidal fringe irradiance profile at the object location is given by I(x) where:

$$I(x) = \cos^2\left[\frac{2\pi}{T}\left\{\left(\frac{F}{d_1-F}\right)x - \left(d_2 - \frac{d_1 F}{d-F}\right)\theta\right\}\right]$$

It is noteworthy that as θ changes, the phase of the sinusoidal fringe pattern changes. In other words, the position of the sinusoidal fringe pattern is a function of the incident angle of the laser beam, θ, in the system. This angular dependence of the fringe pattern can be eliminated by proper choice of the distances $d_1$ and $d_2$ for a given projection lens 115 focal length F. Thus, if the longitudinal distance between the projection lens 115 and the grating 110 is properly set, then any angular movement of the laser beam 105 that impinges on the grating will not result in fringe pattern motion. Eliminating errors introduced by light source 105 motion will in turn improve metrology and imaging data quality in various types of systems and devices using fringe generation based techniques.

After making this discovery, it becomes desirable to evaluate the θ dependent term in the I(x) function discussed above. Further analysis reveals that the θ dependence will be eliminated if $d_2$ is set such that:

$$d_2 = \frac{d_1 F}{d_1 - F}$$

Rearranging this equation, results in the following lens formula relationship:

$$\frac{1}{d_1} + \frac{1}{d_2} = \frac{1}{F}$$

Thus, this algebraic manipulation reveals that the θ dependence of the system will be eliminated if the system is set-up such that the projection lens 115 images the plane of the grating 110 out to the plane of the object being measured. Although the aspects of the invention are discussed in relation to specific illustrative embodiments, the general features of the invention relating to projection lens and grating positioning apply to all imaging systems and metrology techniques where interferometric fringes are generated upon the surface of an object of interest.

Figure 2:
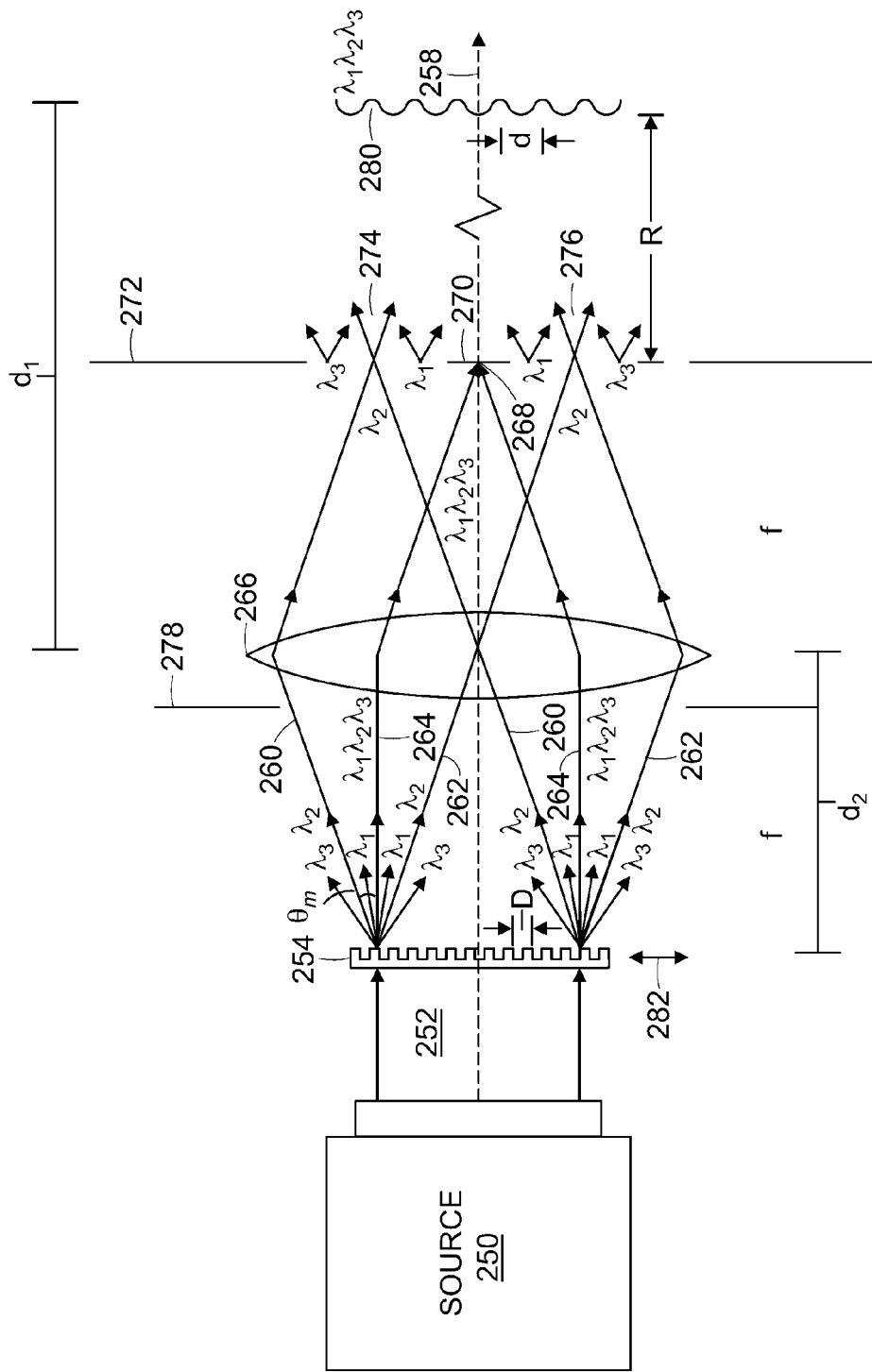
FIG. 2 illustrates an embodiment of an interference-fringe projector suitable for use with various aspects of the invention.

Referring now to FIG. 2, therein is shown an embodiment of a broadband or white-light interference fringe projector. Light source 250 generates a substantially collimated beam of radiation 252 that is directed to translatable diffraction grating 254 at substantially normal incidence before passing to projection lens 266. The aspects of the invention discussed above in relation to FIG. 1 are directly applicable to the source 250, grating 254, lens 266 arrangement substantially at positions $d_1$ and $d_2$ as shown in this embodiment.

It should be noted that the fringe-generation scheme depicted in FIG. 2 can also produce fringes using narrowband or laser illumination while incorporating the features of the invention discussed in relation to FIG. 1. One advantage of using diffraction grating 254 followed by lens 266 for narrow-band illumination is that fringe period d is insensitive to wavelength so that frequency drifts of the source do not substantially degrade measurements. For example, although laser diodes are relatively inexpensive and readily available sources, they have a temperature-dependent operating wavelength. However, since this technique is insensitive to temperature-dependent wavelength shifts, laser diodes can be used without measurement degradation.

Again referring to FIG. 2, diffraction grating 254 is shown with grating period D. Input beam 252 is represented by three constituent wavelength components $\lambda_1$, $\lambda_2$, and $\lambda_3$ for illustration. Beam 252, in actuality, can have arbitrary spectral composition. Diffraction grating 254 splits beam 252 into multiple diffracted beams whose diffraction orders can be represented by the integer m. For illustration purposes, only rays along the perimeter of beam 252 are shown. These diffracted beams propagate at angles $\theta_m$ with respect to the optical axis 258 according to the grating equation for normal incidence, which is given by:

$$\sin\theta_m = \frac{m}{\lambda D}$$

In one embodiment, diffraction grating 254 is designed to maximize and equalize the diffracted efficiency for the diffraction order m=+1 diffracted beam 260 and the diffraction order m=−1 diffracted beam 262. In other embodiments, diffraction grating 254 is designed to maximize and equalize the diffracted efficiency for any set of positive and negative beams of equal order |m|, and to minimize the energy diffracted into all other orders. Any residual undiffracted (m=0) beam 264, will pass undeviated through diffraction grating 254 and is focused by projection lens 266 onto focal spot 268.

The spectral components $\lambda_1$, $\lambda_2$, and $\lambda_3$ of focal spot 268 substantially overlap. Focal spot 268, in one embodiment, may be substantially blocked by the central obstruction 270 of optional double slit 272. The different spectral components $\lambda_1$, $\lambda_2$, and $\lambda_3$ of diffracted beams 260 and 262 are focused by lens 266 onto spectral regions 274 and 276. The distance a($\lambda$) between the focal spot within spectral region 274 and the focal spot within spectral region 276 corresponding to a given wavelength $\lambda$ is substantially proportional to the wavelength $\lambda$. Aperture stop 278 of lens 266, in one embodiment, can be used to block undesired higher-order diffracted beams. In other embodiments the aperture stop is not used. Any undesired residual diffracted orders that pass through lens 266 can be blocked, in another embodiment, by the opaque regions of optional double slit 272. Radiation from the two spectral regions 274 and 276 expands and overlaps as it propagates and forms an interference-fringe pattern 280. Fringe pattern 280 has representative fringe period d at representative distance R from double slit 272.

In one embodiment, diffraction grating 254 is a thin phase grating having a square-wave phase profile whose relative phase delay alternates between 0° and 180° for a representative wavelength, $\lambda_2$, with a 50% duty cycle. Although in various embodiments any suitable grating can be used. Grating 254 is relatively efficient, diffracting approximately 40.5% of the available energy into each of the m=−1 and m=+1 diffracted orders, and nominally 0% into the m=0 and other even diffracted orders. The relative phase delay of grating 254 is a function of wavelength, causing the energy in the undiffracted beam 264 at order m=0 to increase for wavelengths that differ from the representative wavelength $\lambda_2$.

Phase shifting the resulting broadband (or narrow-brand) interference-fringe pattern 280 is achieved by simply translating diffraction grating 254 in the direction 282 shown in FIG. 2. White-light or broadband phase shifting is realized because a translation of diffraction grating 254 by a given fraction of the grating period D shifts each spectral component of fringe pattern 280 by twice the same fraction of the fringe period d. For example, a translation of grating 252 by D/4, or one-quarter cycle, also shifts the interference-fringe pattern 280 by one-half cycle.

Accordion motion (or variation of fringe size) of interference-fringe pattern 280 can be achieved in a number of ways. In one embodiment, for small diffracted angles $\theta_m$, doubling the period D of grating 254 halves the magnitude of $\theta_m$ of beams 260 and 262 which in turn doubles the period d of fringe pattern 280. In another embodiment, decreasing the focal length f of lens 266 can increase the period d of fringe pattern 280. However, no matter how changes in the fringe pattern are actuated, the placement of the lens, grating, and object of interest as taught herein contributes to producing fringe stability and reproducibility.

Although methods for reducing the impact of light source movement on fringe motion are discussed above, another aspect of the invention relates to reducing the error when fringe motion is caused by design in a controlled fashion as part of the process of imaging an object. One of the operational features in various fringe generating imaging systems involves precisely translating a grating over specified distances. In some embodiments these translation distances are approximately 50 mm. Generally, the only limitations on translation distance are a function of a given imaging system set up and the size of the diffraction grating. In various embodiments, the accuracy with which the lateral position of the grating needs to be known is approximately $\frac{1}{10}$ of a micrometer. In general various aspects of the invention relate to accurately knowing the position of the grating because the position of the projected fringes is directly correlated with the position of the grating. This is discussed above in relation to translatable grating 254 in FIG. 2.

Figure 3:
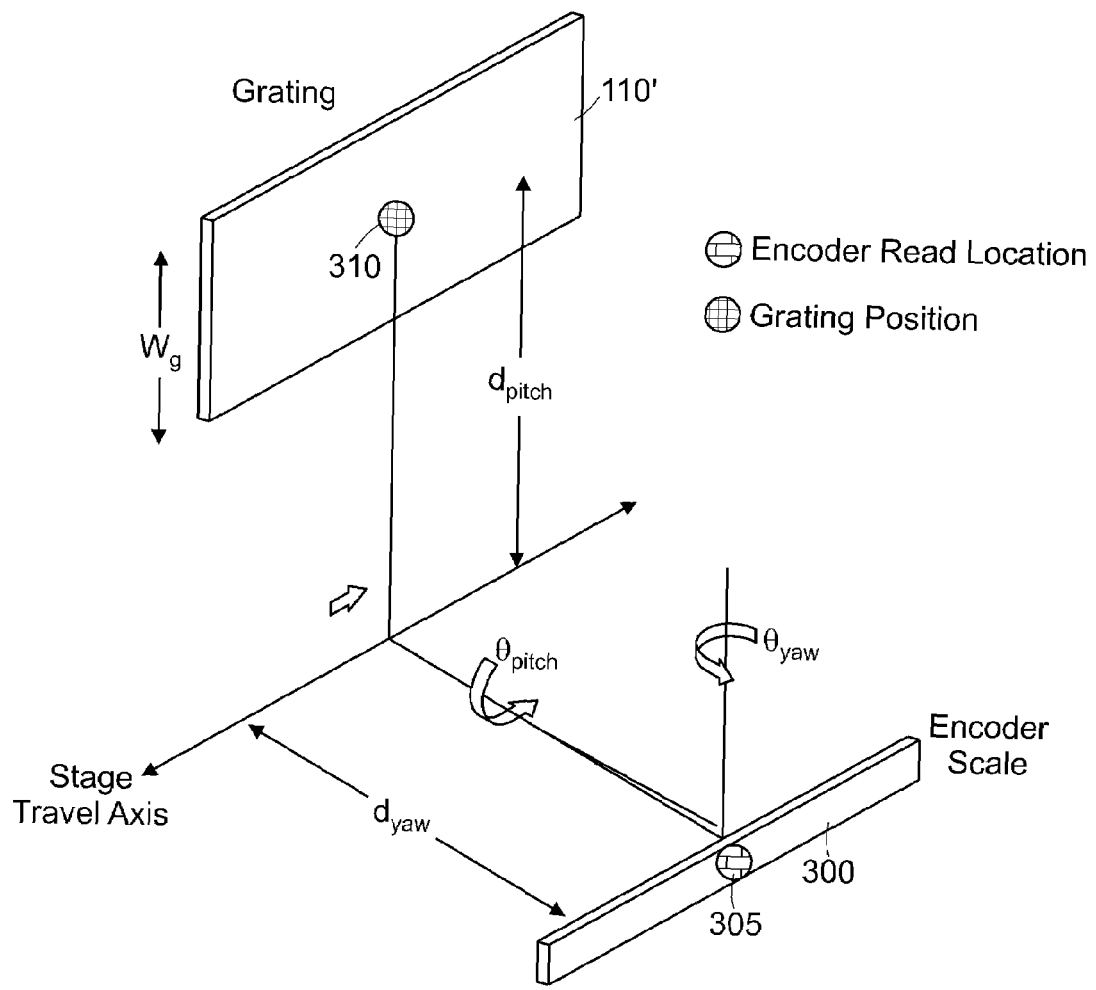
FIG. 3 illustrates the characteristics of a diffraction grating suitable for use with various aspects of the invention.

FIG. 3 schematically illustrates a grating 110' and an encoder scale 300 according to an embodiment of the invention. The discussion of grating 110' shown in FIG. 2 also applies to the grating 110 in FIG. 1 and the grating 254 in FIG. 2. Generally, the discussion of FIGS. 3, 4A and 4B applies to those embodiments wherein a grating is translated to change the characteristics of a fringe pattern as part of an imaging or metrology system.

In various interferometric measuring systems, a commercial linear encoder can be used to determine the position of the grating (110, 110', 254). Other types of measurement devices employing fixed scales and devices for reading those scales can also be used in other embodiments. The linear encoder operates by monitoring the position of an encoder scale 300 with an encoder read-head (not shown). One of the largest sources of error that is typically encountered when using a linear encoder is Abbé error. Abbé error occurs when the spatial position of interest is displaced from the true position recorded by the measuring system. This in turn results in the introduction of errors in any system using the data generated by the measuring system.

Still referring to FIG. 3, in some interferometric measuring systems embodiments, Abbé error is encountered when the object for which positional information is sought (in our case the grating 110') is not at the same location as the position measuring device. In the illustrative embodiment shown in FIG. 3, this measuring device is a linear encoder read-head. As the object (grating 110') is translated, any relative angular changes between the measuring device and the grating 110' will result in Abbé error.

Again referring to FIG. 3, the position 305 on the encoder scale 300 represents the location where the encoder read-head is making a position measurement. The position 310 on the grating 110' represents the location that must be tracked and measured to obtain overall grating positional information. Typically, in various embodiments the grating 110' and encoder scale 300 are rigidly coupled, and are translated by a motorized stage (not shown) along the stage travel axis shown in the FIG. 3. As the stage is translated, the grating 110' and encoder scale 305 both incur small angular rotations due to imperfections in the stage. Two of these angular rotations, pitch and yaw, will introduce Abbé error.

The easiest way to visualize this is to assume that the axes of the pitch and yaw rotations intersect at the encoder read-head location. (This is not a necessary condition for Abbé error to occur. It is only assumed for visualization purposes.) In this case, as the stage pitches and yaws, the encoder read-head value does not deviate. However, the grating position 310 will change due to the pitch and yaw. The amount that the grating position changes (see FIG. 3) is approximately $d_{pitch}\theta_{pitch}$ in the pitch direction and $d_{yaw}\theta_{yaw}$ in the yaw direction. Thus in order to reduce the grating position changes, the grating—encoder scale distances, $d_{pitch}$ and $d_{yaw}$, must be minimized or reduced as much as possible.

Figures 4A, 4B:
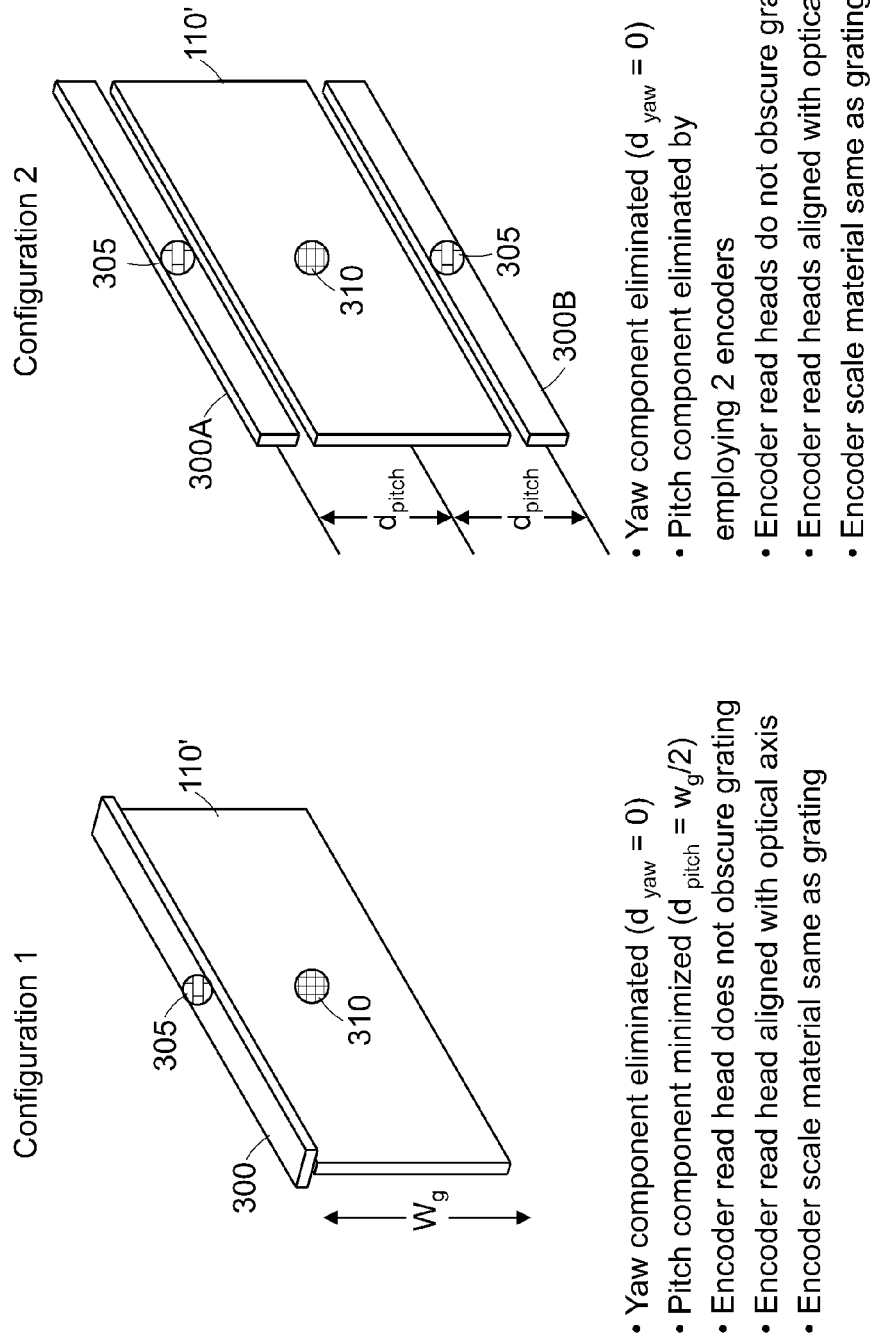
FIGS. 4A and 4B are schematic representations of differing measurement system configurations that illustrate various techniques and approaches for reducing measurement error in accordance with the teachings of the invention.

FIGS. 4A and 4B illustrate some techniques according to the invention for reducing Abbé error. Configuration 1 shown in FIG. 4A is applicable to various gratings such as the one shown in FIG. 3. The encoder scale is mounted perpendicular to the grating and directly over it. This configuration typically eliminates the yaw component of the Abbé error, and minimizes the pitch component. Note that the pitch component is not completely eliminated, because the encoder scale cannot occlude the grating if the system is to operate properly. In one embodiment of the invention the encoder read-head is aligned with the optical axis of the system's projection lens. In some embodiments the grating 110' and encoder scale 300 are fabricated from the same materials to facilitate a reduction of temperature-based errors. These two system aspects eliminate imaging system errors that would otherwise be present due to temperature changes in the various imaging and metrology systems.

The implementation of Configuration 1 in FIG. 4A does not completely eliminate the Abbé error due to stage pitch. Another proposed implementation (See Configuration 2 in FIG. 4B), may eliminate or substantially reduce the Abbé error due to pitch. This configuration uses two linear encoder scales 300A, 300B (and one or more measuring devices, typically two encoder read-heads). The measurement scales are positioned with one above and one below the grating 110' as shown. Knowing the relative positions of the two read-heads with respect to the grating 110', it is possible to take the two readings from the two encoders 300A, 300B and calculate the pitch error at the grating center. This type of differential measuring enables differences between the two encoder scales readings to facilitate a determination of pitch error. In some embodiments a processor, such as a computer processor or logic circuit, carries out the pitch error and yaw error calculations. As with Configuration 1, the encoder scales 300A, 300B lie in the same plane as the grating 110', so that the yaw error is approximately zero. As one variation of Configuration 2, the encoder scales and gratings are fabricated on a single substrate in various embodiments. This provides improved alignment and enhanced thermal stability. Further error reduction can be achieved by combining the general aspects of the invention relating to encoder scale and optical element positioning in one device or measurement system.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. A method for reducing error in interferometric fringe stability and reproducibility in an interference fringe generator, the method comprising the steps of:
   providing a light source;
   positioning a diffraction grating to receive light from the light source, the diffraction grating producing a plurality of diffraction orders therefrom; and
   positioning a projection lens having a focal length F to receive light from the diffraction grating and to project an interference fringe pattern of the received light upon an object of interest positioned substantially at a distance $d_1$ from the lens, wherein the lens is positioned substantially at a distance $d_2$ from the diffraction grating and $d_1$, $d_2$, and F are related by $d_2$ being approximately equal to $d_1 F/(d_1-F)$.

2. The method of claim 1 further comprising the step of selecting two diffraction orders of the plurality of diffraction orders.

3. An optical system for reducing error in interferometric fringe stability and reproducibility in an interference fringe generator, the system comprising:
   a light source;
   a diffraction grating positioned to receive light from the light source, the diffraction grating producing a plurality of diffracted orders therefrom; and
   a lens for projecting fringes having a focal length F to receive light from the diffraction grating and to project an interference fringe pattern of the received light upon an object of interest positioned substantially at a distance $d_1$ from the lens, wherein the lens is positioned substantially at a distance $d_2$ from the diffraction grating and $d_1$, $d_2$, and F are related by $d_2$ being approximately equal to $d_1 F/(d_1-F)$.

4. The apparatus of claim 3 further comprising a device for selecting two diffraction orders.

* * * * *